United States Patent [19]
Brandenburg et al.

[11] Patent Number: 6,073,713
[45] Date of Patent: Jun. 13, 2000

[54] CRANKSHAFT POSITION SENSING WITH COMBINED STARTER ALTERNATOR

[75] Inventors: Larry Raymond Brandenburg, Plymouth; John Michael Miller, Saline, both of Mich.

[73] Assignee: Ford Global Technologies, Inc., Dearborn, Mich.

[21] Appl. No.: 09/048,170

[22] Filed: Mar. 25, 1998

[51] Int. Cl.$^7$ .................................................... B60K 1/00
[52] U.S. Cl. ......................... 180/65.2; 180/65.8; 701/22
[58] Field of Search ................... 180/65.1–65.3, 180/65.8; 324/207.2, 660; 701/22

[56] References Cited

U.S. PATENT DOCUMENTS

| | | | |
|---|---|---|---|
| 4,720,638 | 1/1988 | Vollbrecht | 290/38 R |
| 4,810,967 | 3/1989 | Yokoyama et al. | 324/208 |
| 4,851,835 | 7/1989 | Krumholz et al. | 340/870.37 |
| 5,156,125 | 10/1992 | Fukui et al. | 123/414 |
| 5,323,743 | 6/1994 | Kristiansson | 123/179.3 |
| 5,387,253 | 2/1995 | Remboski, Jr. et al. | 73/117.3 |
| 5,444,369 | 8/1995 | Luetzow | 324/207.2 |
| 5,476,082 | 12/1995 | Carpenter et al. | 123/478 |
| 5,481,909 | 1/1996 | Deutsch et al. | 73/117.3 |
| 5,495,127 | 2/1996 | Aota et al. | 290/31 |
| 5,497,084 | 3/1996 | Bicking | 324/207.25 |
| 5,606,946 | 3/1997 | Data et al. | 123/198 E |
| 5,619,956 | 4/1997 | Koziara et al. | 123/41.31 |
| 5,691,588 | 11/1997 | Lutz et al. | 310/92 |
| 5,693,993 | 12/1997 | Ito et al. | 310/68 B |
| 5,719,326 | 2/1998 | Vulih et al. | 73/35.07 |
| 5,747,679 | 5/1998 | Dietz et al. | 73/116 |
| 5,753,804 | 5/1998 | La Palm et al. | 73/116 |
| 5,773,904 | 6/1998 | Schiebold et al. | 310/92 |
| 5,833,022 | 11/1998 | Welke | 180/65.2 |
| 5,841,385 | 11/1998 | Xie | 341/139 |
| 5,850,141 | 12/1998 | Adler | 324/174 |
| 5,880,586 | 3/1999 | Dukart et al. | 324/207.2 |
| 5,901,684 | 5/1999 | Fiaschetti et al. | 123/436 |

FOREIGN PATENT DOCUMENTS

4015701 A1  11/1990  Germany.

Primary Examiner—Eric Culbreth
Assistant Examiner—L. Lum
Attorney, Agent, or Firm—Mark S. Sparschu

[57] ABSTRACT

A crankshaft position sensing apparatus for use with an engine (16) having a combined starter/alternator assembly (18). The crankshaft position sensing apparatus includes a tone ring (38) with a sensor (36) and bandpass filter (46), having a cylinder identification input from a camshaft sensor (48), and a gain limiter (54). The sensing apparatus mounts near the rotor (30) of the combined starter/alternator assembly (18). The filtered crankshaft position signal can then be input into a vehicle system controller (58) and an inner loop controller (60). The starter/alternator assembly (18) in combination with an internal combustion engine is particularly useful for a hybrid electric vehicle system.

21 Claims, 5 Drawing Sheets

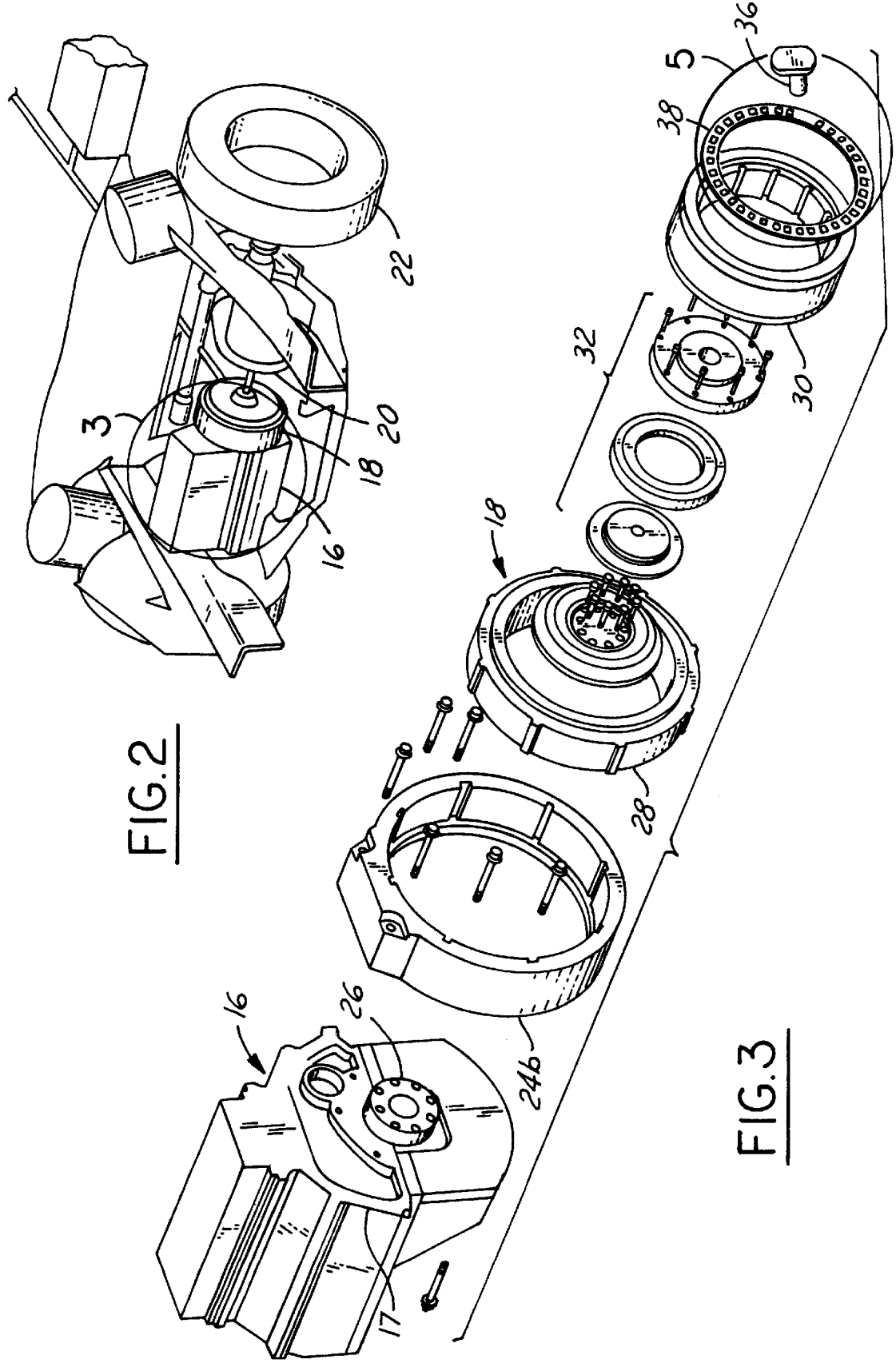

CRANKSHAFT POSITION SENSING WITH COMBINED STARTER ALTERNATOR

This invention was made with Government support under Prime Contract No. DE-AC-36-83CH10093, Subcontract No. ZCB-4-13032-02, awarded by the Department of Energy. The Government has certain rights in this invention.

FIELD OF THE INVENTION

The present invention relates to a sensor assembly for sensing the crankshaft position on an internal combustion engine and more particularly on an engine having an induction type combined starter/alternator.

BACKGROUND OF THE INVENTION

For environmental and other reasons generally, there is a desire to provide for automotive vehicles that operate with propulsion system other than just a typical internal combustion engine. One such propulsion system contemplated is a purely electric vehicle. But since the technology for purely electrical vehicles is not yet practical, (e.g., there are limitations not desired by consumers), combining the electric drive with a somewhat more conventional internal combustion engine is one alternative being considered. With two drive systems in the hybrid vehicle, however, both drive systems, including the internal combustion engine, must be minimal in size.

One of the developments for reducing the overall space taken by the internal combustion engine and its accessories is to substantially reduce in size or even to eliminate the flywheel that normally mounts to the crankshaft at the rear of the engine and to locate a combined starter/alternator in this position. This will substantially reduce the space taken by separate conventional starters and alternators. For instance, an electric machine rotor of the starter/alternator can double as the conventional flywheel.

However, this now creates an electromagnetic interference (EMI) rich environment at the rear of the engine within which the crankshaft position is preferably sensed for the hybrid vehicle. The new system now requires that the sensor operate in the presence of strong electromagnetic fields beneath end turns of a stator and alongside an induction machine rotor. Current production technology, such as Hall effect or Variable Reluctance sensors (VRS), for sensing crankshaft position, then, is unusable in a combined starter/alternator system due to the significant EMI, which is not present at these levels in a conventional flywheel configuration.

To overcome this, one could relocate current crankshaft position sensors to the front of the internal combustion engine, but then the desired resolution of the crankshaft position for this hybrid configuration would be lost. This resolution is needed to more accurately control an indirect field oriented induction machine, thus making relocation an inadequate solution. Consequently, there is a desire to allow for accurate crankshaft position sensing even in an EMI rich field created by an engine with a combined starter/alternator mounted at its rear.

SUMMARY OF THE INVENTION

In its embodiments, the present invention contemplates a crankshaft position sensing apparatus for use with an engine having a combined starter/alternator assembly, a crankshaft, and a camshaft. The crankshaft position sensing apparatus includes a tone ring adapted to affix to a rotational portion of the starter/alternator assembly, with the tone ring including indications spaced circumferentially around the tone ring. Sensing means are located in proximity to the indications and adapted to be fixed rotationally relative to the engine, for producing an initial crankshaft signal in response to rotation of the tone ring; and camshaft sensing means are adapted for producing a camshaft position signal in response to rotational motion of the camshaft. A bandpass filter receives and processes the initial crankshaft signal and the camshaft position signal and produces a filtered crankshaft signal. A limiter receives the filtered crankshaft signal and outputs a crankshaft rotational position signal.

Accordingly, an object of the present invention is to allow for a preferred location for crank position sensing at the rear of the engine when employing an induction type flywheel starter/alternator system.

A further object of the present invention is to allow for accurate signal determination by employing bandpass and tracking filters, for robust sensing in the EMI rich environment around the starter/alternator.

An advantage of the present invention is that a VRS or Hall Effect Sensor can accurately measure crankshaft position even when subjected to an EMI rich environment from a hybrid electric vehicle.

BRIEF DESCRIPTION OF THE DRAWINGS

FIG. 2 is an enlarged view of encircled area 2 in FIG. 1;

FIG. 3 is an exploded perspective view of encircled area 3 in FIG. 2;

DETAILED DESCRIPTION OF THE PREFERRED EMBODIMENTS

Figure 1:
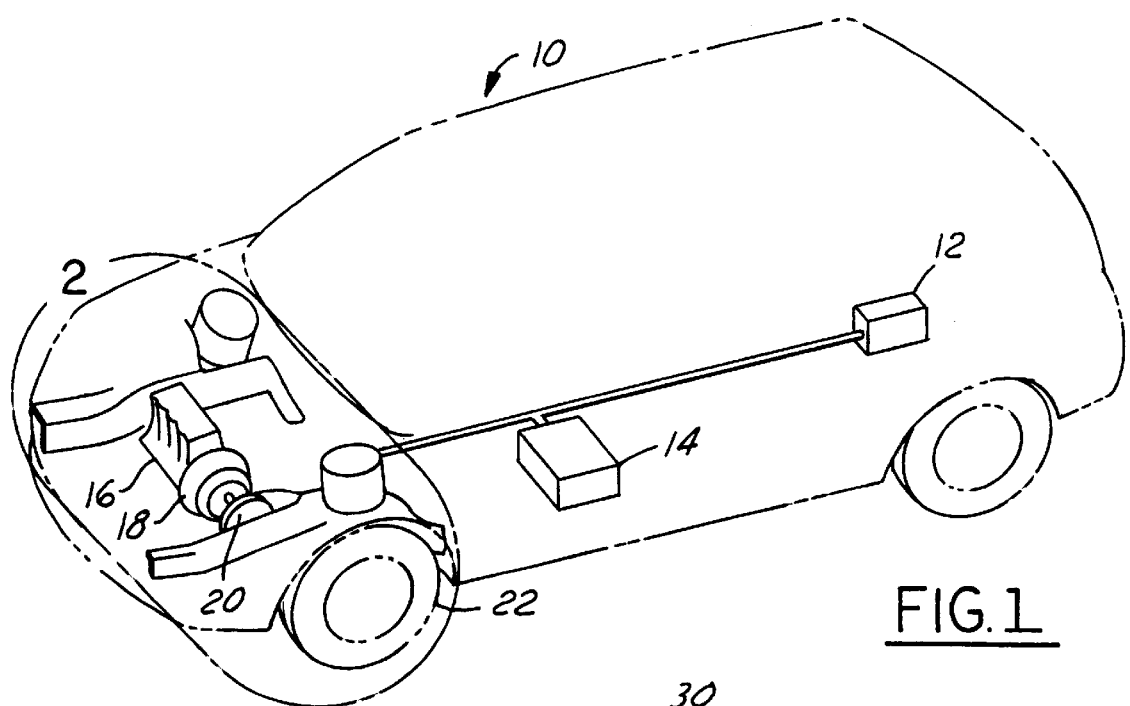
FIG. 1 is a schematic perspective view of a vehicle in accordance with the present invention.

FIGS. 1 and 2 illustrate a schematic of a portion of a hybrid electric vehicle 10 including an electric drive system having an inverter 12 and a battery 14. A transmission 20 is electrically connected to the inverter 12 and drive motors, not shown, in order to drive the front wheels 22. The vehicle 10 also includes a transversely mounted internal combustion engine 16, for supplying power, when needed, to charge the battery 14. Affixed to the back end of the engine 16, and driven by a rear hub portion of an engine crankshaft 26 is a starter/alternator assembly 18. This assembly 18 can act as a starter for the engine 16 and also can convert the output of the engine 16 into the electrical power that charges the battery 14.

Figure 4:
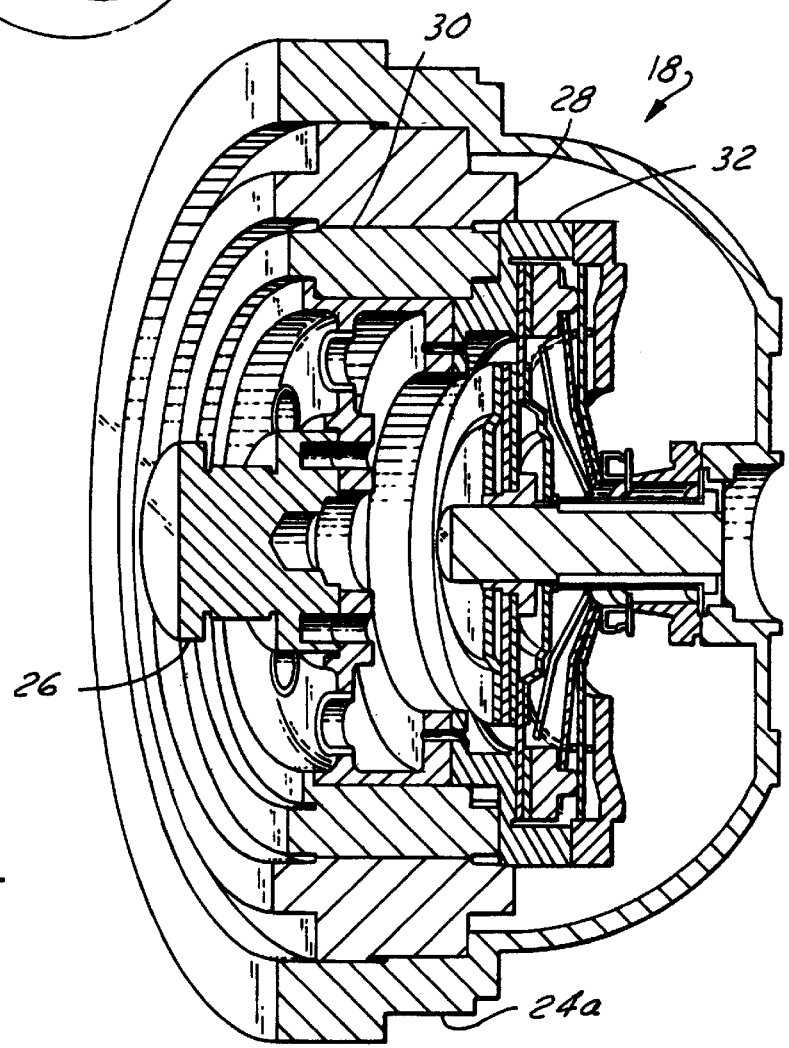
FIG. 4 is a cross-sectional view of a flywheel starter/alternator in accordance with the present invention.
Figure 5:
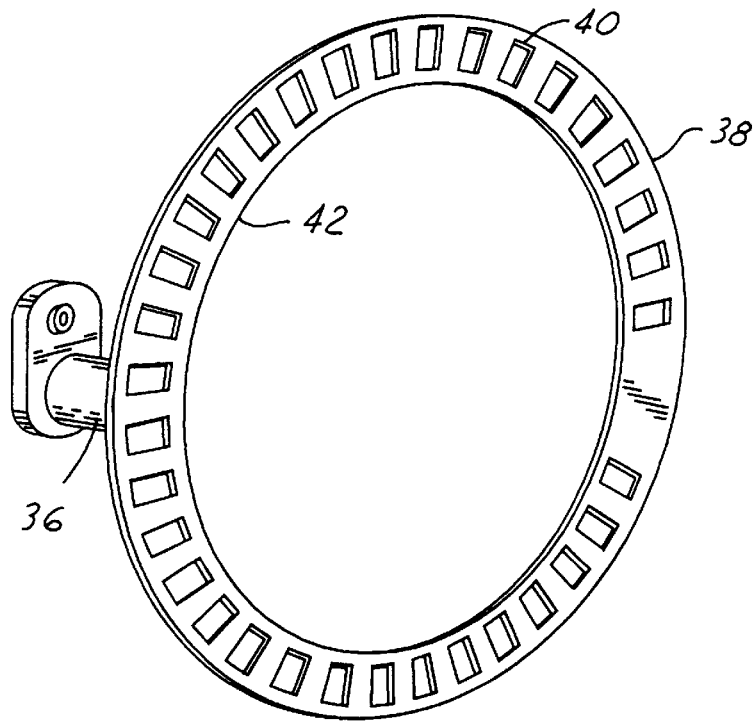
FIG. 5 is an enlarged perspective view of a tone ring and sensor as illustrated in the encircled area 5 in FIG. 3, rotated 180 degrees.

FIGS. 3–5 better illustrate the starter/alternator assembly 18. As discussed above, in order to allow for two drive systems in a hybrid electric vehicle, each must be as compact as possible. The combined starter/alternator 18 is built in an annular volume around a coaxial twin plate dry clutch 32. It includes a housing, illustrated as a bell housing 24a in FIG. 4 and as an open housing 24b in FIG. 3. The housing 24a or 24b mounts to the engine block 17 at the rear of the engine 16, around the end of the crankshaft 26.

Rotationally fixed to the inner wall of the housing 24 is a stator 28, and rotationally mounted radially within the stator 28 is a rotor 30. The rotor 30 connects to a first side of the clutch assembly 32. The second side of the clutch assembly 32 connects to the crankshaft 26. When the starter/alternator assembly 18 is acting as a starter, the first side is the driving side and the second side of the clutch 32 is the driven. When the starter/alternator assembly 18 is acting as an alternator, the second side of the clutch 32 is the driving side and the first side is the driven.

Given the compact configuration of the starter/alternator assembly 18, and hence the small diameter clutch assembly 32, a conventional crankshaft position sensor would need to be located at a short radius, requiring the sensor to be located in either the engine's oil pan or inside the engine block 17 near the engine's rear seal. With the present invention however, a crankshaft position sensor 36 is located at an intermediate radial distance from the crankshaft 26 such that it is physically possible to locate it facing into the rotor 30 and be accessible from outside the engine block 17 and oil pan. Preferably, this sensor 36 is either a variable reluctance sensor or a Hall Effect sensor.

For this location of the crankshaft position sensor 36, instead of employing holes in a flywheel as in a conventional configuration, a special tone ring 38 is employed. The tone ring 38 is preferably fabricated of lamination steel, having windows 40 cut out that approximate the slot/tooth dimensions preferred for the particular crankshaft position sensor 36 employed. The tone ring 38 illustrated herein shows a window arrangement in a conventional 36-2 pattern around its perimeter in proportions generally desirable for a VRS or Hall Effect sensor. Preferably, the inside radius 42 of the tone ring 38 matches the radius of the rotor 30, and the tone ring radial depth matches the end ring depth of the rotor 30. As for mounting, the tone ring 38 can be affixed to the rotor end ring during rotor aluminum cage casting.

Figure 6:
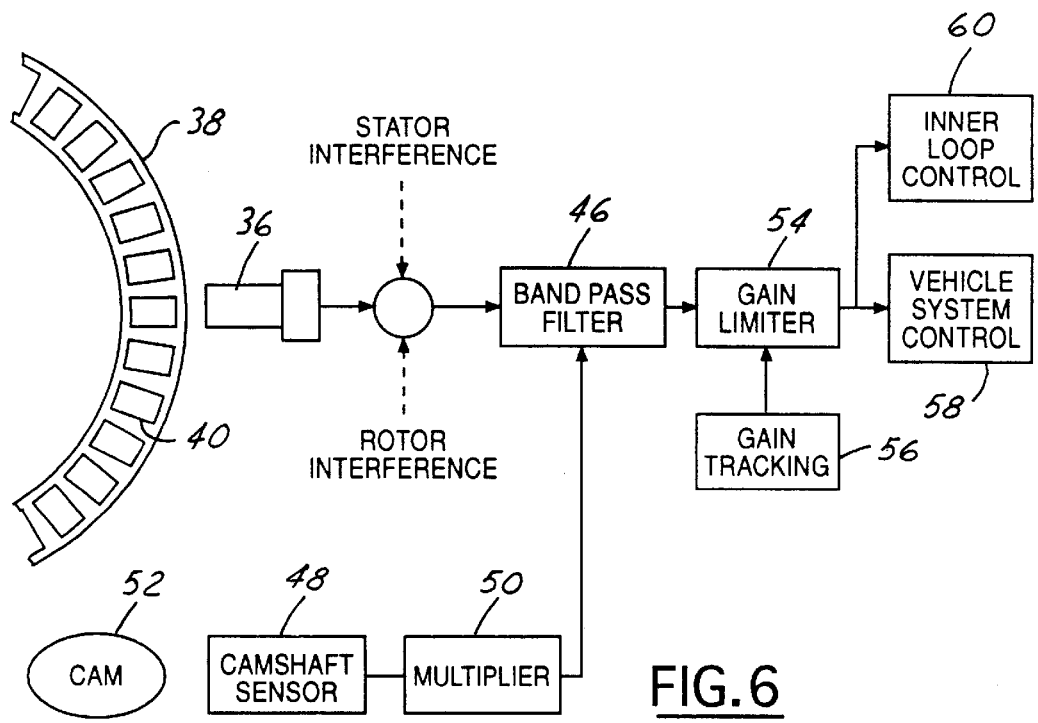
FIG. 6 is a block diagram of the circuit connected to the crankshaft position sensor in accordance with the present invention.

Turning now to FIG. 6, the crankshaft position sensor 36 and signal processing components are illustrated. These components act to extract the corrupted VRS crankshaft position signal from the EMI generated by the starter/alternator 18, illustrated in FIGS. 1–4.

Electromagnetic noise is created due to the magnetic coupling from the end turns of the stator 28 and similar fields from the rotor 30. This noise introduces a common mode component into the crankshaft position signal. (This is illustrated in phantom in FIG. 6 as stator interference and rotor interference being added to the VRS crankshaft position signal.) Additionally, the high end-ring tangential magnetic field intensity drives the tone ring 38 into saturation in special regions where the peaks of the slip current occur, and the mechanical drive frequency effect causes the crankshaft position signal to be amplitude modulated, (blurring of the tone ring windows 40). The signal processing components described below correct for these errors.

The crankshaft position sensor 36, which is located in proximity to the passing windows 40 on the tone ring 38, is electrically connected to a bandpass filter 46. The filter 46 also receives input from a camshaft cylinder identification sensor 48, through an adjustment multiplier 50 that accounts for the difference in rotational speed between a crankshaft and a camshaft. The camshaft sensor 48 reads the information from a camshaft wheel 52, as in conventional engines. The bandpass filter 46 then, is preferably of the switched capacitor type in which the center of frequency is a multiple of the cylinder identification frequency, (i.e., tracks the expected tone ring frequency and is an electromagnetic clean signal).

The output of the bandpass filter 46 is an input to a gain limiter 54, having another input for gain tracking 56, allowing for extraction of the fundamental (36-2 tooth) tone wheel information and index pulse. The output of the gain limiter 54, then, provides the filtered crankshaft position signal, which is available as input to a vehicle system controller 58 and an inner loop controller 60 for the alternator/starter assembly 18.

The general operation of the system will now be described. During engine cranking the starter/alternator 18 is energized in the cranking mode with the first side of the clutch 32 driving the second side. High torque is developed and the engine crankshaft 26 is accelerated from standstill. In this cranking mode, the starter/alternator 18 starts up under open loop control until a few pulses of a cylinder identification signal from the camshaft sensor 48 are multiplied, by the multiplier 50, to match the passing frequency of the windows 40 in the tone ring 38. The signal is then filtered through the bandpass filter 46 and the gain limiter 54. Subsequently, the alternator/starter inner loop (indirect field orienter) enters closed loop control (field oriented control) by employing the signal from the inner loop controller 60. Also, the filtered crankshaft position signal is sent to the vehicle system controller 58, providing information for engine operation (such as ignition timing, etc.).

Figure 7:
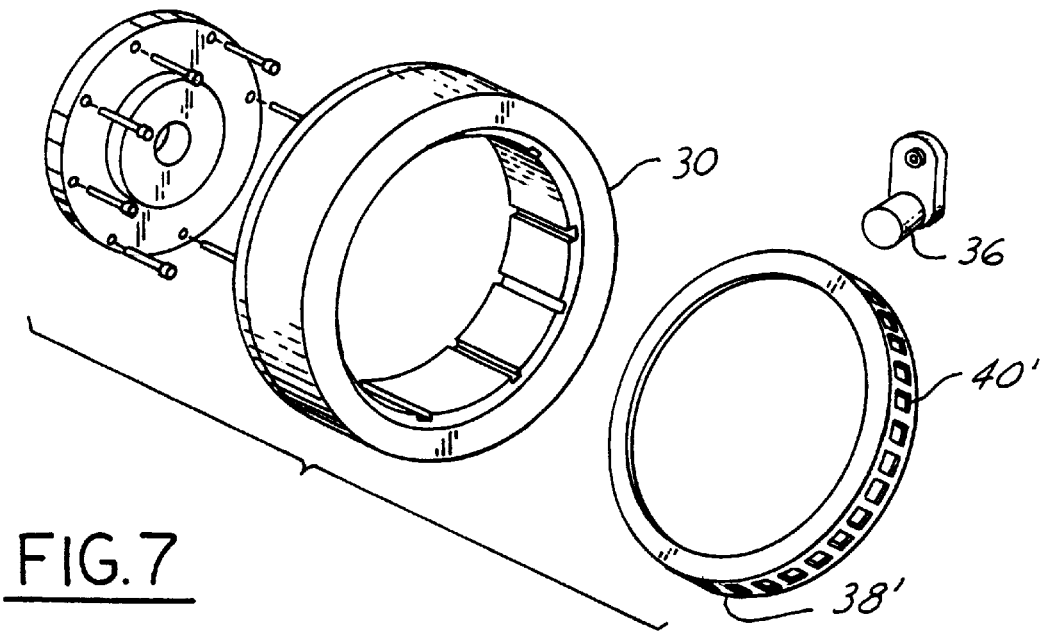
FIG. 7 is an exploded perspective view of the tone ring and sensor, similar to FIG. 3, in accordance with another embodiment of the present invention.
Figure 8:
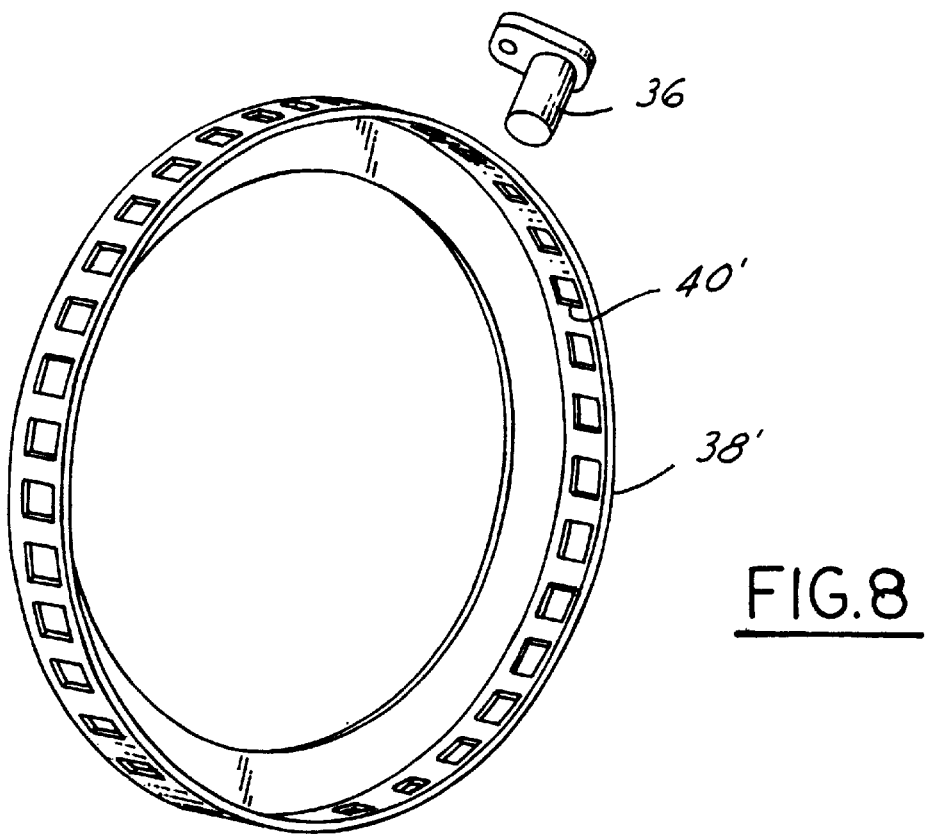
FIG. 8 is an enlarged view of the tone ring and sensor in accordance with the embodiment of FIG. 7.

An alternate embodiment illustrating a tone ring and crankshaft position sensor is shown in FIGS. 7 and 8. In this embodiment, the crankshaft position sensor 36 remains the same although it is reoriented to account for a differently shaped tone ring 38'. For this tone ring 38', the windows 40' face radially outward (around a cylindrical outer surface rather than along a circular surface as in the first embodiment) and the crankshaft position sensor 36 faces radially inward toward the windows 40'.

Figure 9:
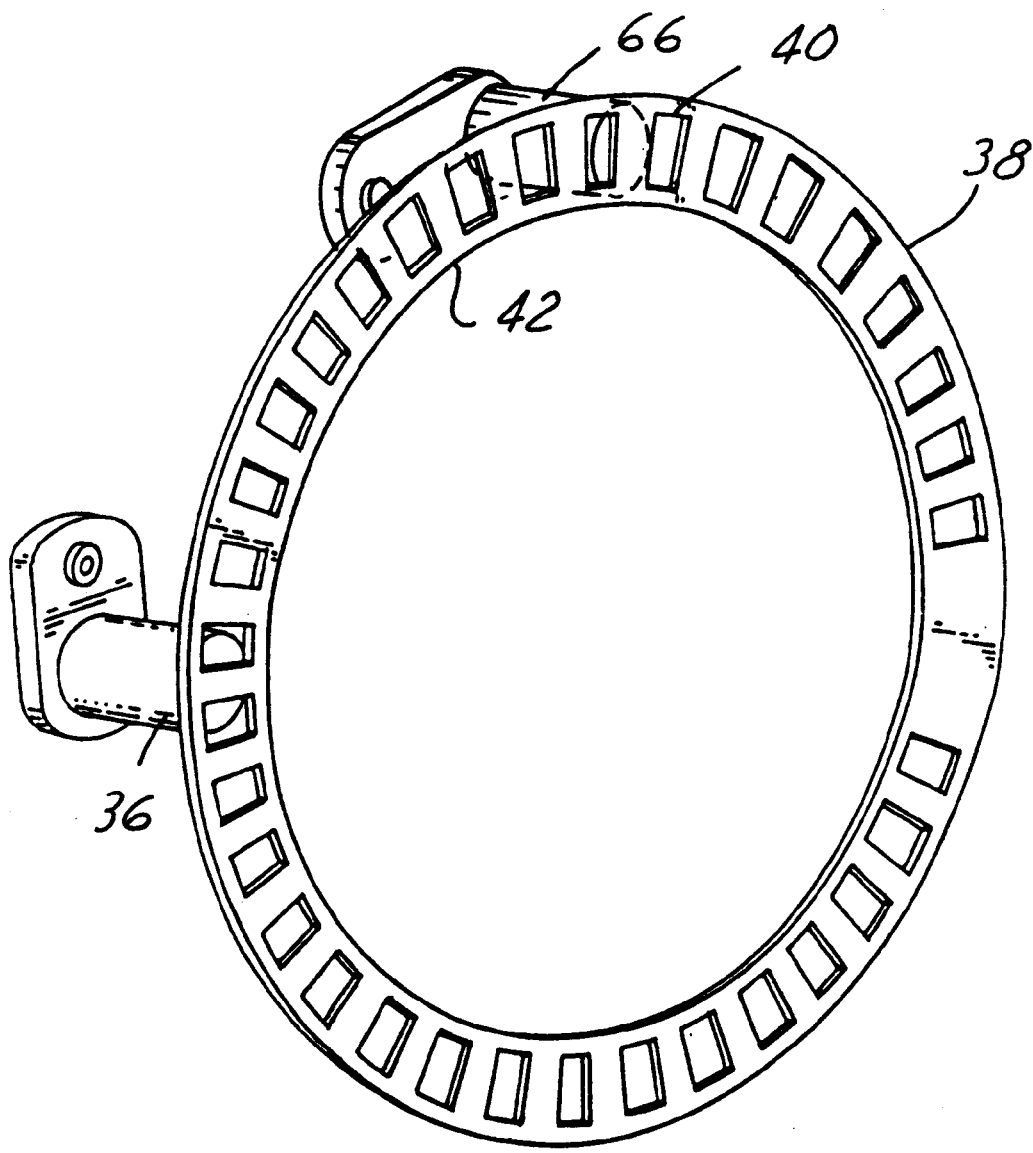
FIG. 9 is a view similar to FIG. 5, illustrating a further embodiment of the present invention.

Another embodiment is illustrated in FIG. 9. In this embodiment an additional crankshaft position sensor 66, again preferably a Hall Effect or VRS type, is mounted adjacent the tone ring, but circumferentially spaced from the first crankshaft position sensor 36. Both of the crankshaft sensors will send a signal to the bandpass filter and can be used to generate a quadrature signal and hence double the position resolution.

While certain embodiments of the present invention have been described in detail, those familiar with the art to which this invention relates will recognize various alternative designs and embodiments for practicing the invention as defined by the following claims.

We claim:

1. A crankshaft position sensing apparatus for use with an engine having a combined starter/alternator assembly, a crankshaft, and a camshaft, the crankshaft position sensing apparatus comprising:

a tone ring adapted to affix to a rotational portion of the combined starter/alternator assembly, with the tone ring including indications spaced circumferentially around the tone ring;

sensing means, located in proximity to the indications and adapted to be fixed rotationally relative to the engine, for producing an initial crankshaft signal in response to rotation of the tone ring;

camshaft sensing means adapted for producing a camshaft position signal in response to rotational motion of the camshaft;

a bandpass filter for receiving and processing the initial crankshaft signal and the camshaft position signal and for producing a filtered crankshaft signal; and a limiter for receiving the filtered crankshaft signal and for outputting a crankshaft rotational position signal.

2. The crankshaft position sensing apparatus of claim 1 further including means for gain tracking with an output connected to an input on the limiter.

3. The crankshaft position sensing apparatus of claim 2 wherein the camshaft sensing means includes a camshaft sensor and a multiplier connected between the camshaft sensor and the bandpass filter.

4. The crankshaft position sensing apparatus of claim 3 wherein the bandpass filter is a switched capacitor filter.

5. The crankshaft position sensing apparatus of claim 4 further including a vehicle system controller, with an output of the limiter input to the vehicle system controller.

6. The crankshaft position sensing apparatus of claim 5 further including an inner loop controller, with the output of the limiter input to the inner loop controller.

7. The crankshaft position sensing apparatus of claim 1 wherein the camshaft sensing means includes a camshaft sensor and a multiplier connected between the camshaft sensor and the bandpass filter.

8. The crankshaft position sensing apparatus of claim 1 further including a vehicle system controller, with an output of the limiter input to the vehicle system controller, and an inner loop controller, with the output of the limiter input to the inner loop controller.

9. The crankshaft position sensing apparatus of claim 1 wherein the tone ring is generally shaped as a flat disk and wherein the indications are windows formed through the disk in the plane of the disk.

10. The crankshaft position sensing apparatus of claim 1 wherein the tone ring includes a generally flat disk portion and an outer ring portion extending generally normal to the flat disk portion and wherein the indications are windows formed through the outer ring portion of the disk.

11. The crankshaft position sensing apparatus of claim 1 wherein the sensing means includes a Hall Effect sensor.

12. The crankshaft position sensing apparatus of claim 1 wherein the sensing means includes two sensors located in proximity to the indications and spaced apart circumferentially about the tone ring.

13. The crankshaft position sensing apparatus of claim 1 wherein the sensing means includes a variable reluctance sensor.

14. A hybrid drive system for a vehicle comprising:

an internal combustion engine having a crankshaft, and a camshaft;

a starter/alternator assembly operatively engaging the crankshaft and having a housing fixed to the engine;

a tone ring affixed to a rotational portion of the starter/alternator assembly, with the tone ring including indications spaced circumferentially around the tone ring;

crankshaft sensing means, located in proximity to the indications and fixed rotationally relative to the housing, for producing an initial crankshaft signal in response to rotation of the tone ring;

camshaft sensing means for producing a camshaft position signal in response to rotational motion of the camshaft;

a bandpass filter for receiving and processing the initial crankshaft signal and the camshaft position signal and for producing a filtered crankshaft signal; and a limiter for receiving the filtered crankshaft signal and for outputting a crankshaft rotational position signal.

15. The hybrid drive system of claim 14 further including means for gain tracking with an output connected to an input on the limiter, and wherein the camshaft sensing means includes a camshaft sensor and a multiplier connected between the camshaft sensor and the bandpass filter.

16. The hybrid drive system of claim 14 wherein the crankshaft sensing means includes a variable reluctance sensor.

17. The hybrid drive system of claim 14 wherein the starter/alternator assembly includes a stator fixed to the housing and a rotor rotatably mounted relative to the stator, with the tone ring being affixed to the rotor.

18. The hybrid drive system of claim 17 further including a clutch selectively connecting the rotor to crankshaft.

19. The hybrid drive system of claim 14 further including a vehicle system controller, with an output of the limiter input to the vehicle system controller, and an inner loop controller, with the output of the limiter input to the inner loop controller.

20. A vehicle having a hybrid drive system comprising:

an electric drive system;

an internal combustion engine including a crankshaft and a camshaft;

a starter/alternator, connected between the crankshaft and the electric drive system, including a housing affixed to the internal combustion engine with a stator rotationally affixed to the housing, a rotor rotatably mounted within the stator, and a clutch having a first side rotationally affixed to the crankshaft and a second side rotationally affixed to the rotor; and a crankshaft position sensing assembly including a tone wheel rotationally cooperating with the rotor and having indications circumferentially spaced thereon, a crankshaft sensor mounted rotationally fixed relative to the housing adjacent a portion of the tone wheel, camshaft position sensing means for tracking the location of the camshaft, bandpass filter for receiving signals from the crankshaft sensor and the camshaft position sensing means and for producing a filtered crankshaft signal, means for gain tracking, and a limiter for receiving the filtered crankshaft signal and gain tracking signal and outputting a crankshaft rotational position signal.

21. The crankshaft position sensing apparatus of claim 1 wherein the combined starter/alternator assembly includes a stator affixed to a housing, and a rotor mounted adjacent to the stator, with the tone ring affixed to the rotor.

* * * * *